United States Patent [19]

Morita et al.

[11] Patent Number: 4,596,016

[45] Date of Patent: Jun. 17, 1986

[54] SINGLE MODE CARBON DIOXIDE GAS LASER OSCILLATOR HAVING HIGH OUTPUT POWER

[75] Inventors: Yasuyuki Morita, Yokohama; Reiji Sano, Kawasaki, both of Japan

[73] Assignee: Matsushita Electric Industrial Co., Ltd., Kadoma, Japan

[21] Appl. No.: 513,794

[22] Filed: Jul. 14, 1983

[30] Foreign Application Priority Data

Jul. 14, 1982 [JP] Japan ................................. 57-122554

[51] Int. Cl.$^4$ ................................................. H01S 3/22
[52] U.S. Cl. ............................................ 372/58; 372/59
[58] Field of Search ............... 378/58, 55, 61; 372/33, 372/59, 93, 92, 98

[56] References Cited

U.S. PATENT DOCUMENTS 4,351,052 9/1982 Sasaki et al. ........................ 372/58

Primary Examiner—Léon Scott, Jr.
Attorney, Agent, or Firm—Cushman, Darby & Cushman

[57] ABSTRACT

A carbon dioxide laser oscillator comprises a discharge tube, total reflecting mirrors and partially reflecting mirrors arranged at opposite ends of the discharge tube, a pair of electrodes for causing electrical discharge to occur in the discharge tube and means for flowing laser gas through the discharge tube so that the gas flows at a rate that satisfies the condition in which the Reynolds number is equal to or smaller than $1 \times 10^4$.

6 Claims, 5 Drawing Figures

SINGLE MODE CARBON DIOXIDE GAS LASER OSCILLATOR HAVING HIGH OUTPUT POWER

BACKGROUND OF THE INVENTION

This invention relates to a carbon dioxide laser oscillator for use in processing materials such as cutting or welding.

Carbon dioxide laser oscillators are currently in use for processing materials such as woods, metals, and plastics because of their relatively high power output capability. However, still higher output capability and compactness are desired as carbon dioxide lasers find their use in a wide range of applications. One attempt is to cause the gas in a laser tube to flow at high speed. However, mere attempts to flow the gap rapidly in the laser tube makes it impossible to effect single mode laser operation or requires a high power gas circulating blower.

SUMMARY OF THE INVENTION

It is an object of the present invention to provide a carbon dioxide laser oscillator for producing high power output in a single mode operation.

Another object of the present invention is to provide a small size carbon dioxide gas laser oscillator.

A further object of the present invention is to determine the proper blowing power of a laser gas blower.

According to the invention, a carbon dioxide laser oscillator comprises a discharge tube, a pair of mirror boxes, one arranged at each end of the discharge tube, a total reflective mirror contained in one of the mirror boxes, a partially reflective mirror contained in another of the mirror boxes, a pair of electrodes for causing an electrical discharge in the discharge tube, and a blower for flowing laser gas in the discharge tube. The laser gas is composed of a mixture of carbon dioxide gas ($CO_2$), nitrogen gas ($N_2$) and helium gas (He), and is flowed in the discharge tube at a speed determined in such a manner that the Reynolds number is equal to or smaller than $1 \times 10^4$. It is desirable to construct the blower in such a manner that the blowing power $Q$(cm$^3$/sec) thereof is determined by the following formula $$Q^2/D^5 \leq 1 \times 10^{10} \text{ cm/sec}^2.$$

BRIEF DESCRIPTION OF THE DRAWINGS

The invention will be described in further detail by way of example with reference to the accompanying drawings, in which.

DETAILED DESCRIPTION

The output power of a laser oscillator can be increased by replacing laser gas in the discharge area with fresh laser gas. This means that the output power of the laser oscillator can be increased by flowing laser gas at high speed in the laser tube. Therefore, laser power P per unit length of an electrical discharge has a strong mutual relationship with the flow rate of the laser gas in the laser tube. The laser power P also has a mutual relationship with the density of the laser gas, too.

In the meantime, an intensity distribution of the laser light emitted from the laser oscillator depends on modes of light waves in a laser resonator. In processing some materials by the laser beam, a single mode having Gaussian distribution is the best mode because the laser beam emits in a small divergent angle and it is possible to produce the smallest circular beam.

The mode of the light waves in the laser resonator has been analyzed theoretically and the mode depends on the length of the resonator, the reflectivity and curvature of the total reflective mirror and the partial reflective mirror used in the laser oscillator, and the diameter of the laser tube which gives an aperture for the light waves. Usually a small aperture of the light waves, in other words small diameter of the laser tube, gives single mode performance. A coaxial-type laser, in which three axes, that is, the optical axis of a resonator, the direction in which the electrical discharge takes place or a DC electric field is applied, and the direction in which the laser gas flows, are aligned with each other, have been usually designed to use a discharge tube having a relatively long length and a small diameter, and therefore, the coaxial type lasers are adaptable for a high power laser oscillator.

When the capacity of a gas blower is constant, the flow speed of the laser gas through the discharge tube is practically determined by the aperture of the discharge tube.

Reynolds number R is given by the following formula $$R = DV/U$$

where, D is a diameter of a tube through which fluid flows, V is the flow speed of the fluid in the tube, and U is the dynamic coefficient of viscosity of the fluid obtained by dividing static coefficient $\mu$ of viscosity of the fluid by density $\rho$ of the fluid. In the invention, the Reynolds number R is applicable for determining the laser power P per unit length of the electrical discharge.

Figure 1:
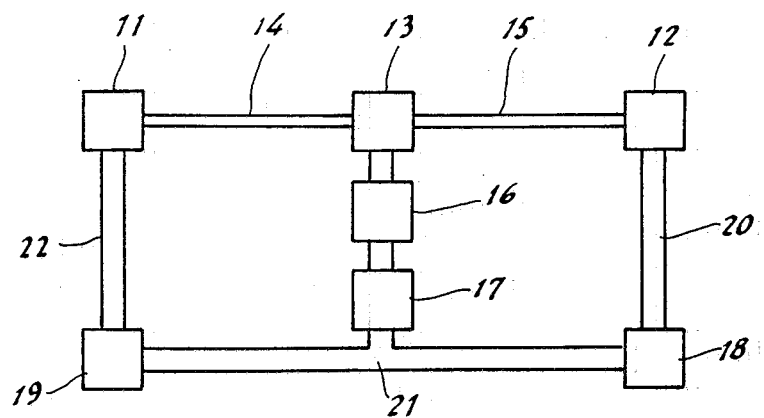
FIG. 1 is a conceptional block diagram of a carbon dioxide laser oscillator according to the present invention.

Referring now to FIG. 1, a mirror box 11 contains a total reflective mirror which is arranged at one end of a discharge tube 14. Numeral 12 shows another mirror box which contains a partial reflective mirror of ZnSe arranged at one end of a discharge tube 15 and located opposite to the total reflective mirror. In each of the mirror boxes 11 and 12, a cathode electrode for causing electrical discharge in the discharge tubes 14 and 15 is disposed. Numeral 13 represents an anode box arranged at another end of the discharge tubes 14 and 15, and an anode electrode is disposed therein to generate a glow discharge between the cathode electrodes in the mirror boxes 11 and 12 by applying high electric voltage thereto. The discharge tubes 14 and 15 are glass tubes having circular crosssections and each detachable between the mirror boxes 11, 12 and anode box 13 to allow replacement by another glass tube having a different inner diameter. A blower 17 blows laser gas at high speed through the discharge tubes 14 and 15 via pipings 20, 21, 22 and thermal exchangers 18, 19. The thermal exchangers 18 and 19 cool the laser gas before sending it to the discharge tubes 14 and 15 because the laser gas sent out from the blower 17 is heated by compression heat of the blower 17. Numeral 16 represents a heat exchanger for absorbing discharge heat of the laser gas sent out from the anode box 13. The laser gas paths of the oscillator are as follows:

(1) blower 17→piping 21→heat exchanger 19→piping 22→mirror box 11→discharge tube 14→anode box 13→heat exchanger 16→blower 17→repeat said steps.

(2) blower 17→piping 21→heat exchanger 18→piping 20→mirror box 12→discharge tube 15→anode box 13→heat exchanger 16→blower 17→repeat said steps.

Now, some experimental results using the laser oscillator in FIG. 1 are explained.

Experiment 1

In the laser oscillator in FIG. 1, glass tubes having a diameter of 45 mm and discharge length of 1 m were used as the discharge tubes 14 and 15. The blower 17 having blowing capacity of 5,600 l/min was used for circulating laser gas at high speed. At this time, laser gas pressure in the laser tubes was 37.5 Torr. The Reynolds number R was calculated for a component ratio of $CO_2$, $N_2$ and He, flow speed, and temperature of the used laser gas. In the above case, $R = 1.7 \times 10^4$ and the laser output power was 1.4 KW during multi-mode operations. The results are plotted as point 1 in FIG. 2. This case corresponds to a conventional high power laser oscillator and is out of the scope of the present invention.

Experiment 2

In the laser oscillator in FIG. 1, glass tubes having a diameter of 13 mm and discharge length of 1.2 m were used as the discharge tubes 14 and 15, and the blower 17 having blowing capacity of 5,600 l/min was used for circulating laser gas at high speed. The laser gas pressure in the laser tubes was observed at 72 Torr and the laser gas flow speed in the laser tubes was observed at 180 m/sec.

Reynolds number R was calculated in the same manner as experiment 1 and a value of $R = 2.9 \times 10^3$ was obtained. The laser output power was 260 W in single mode performance. Therefore, the laser output power P per unit discharge length becomes 216 W/m. This is plotted as point 2 in FIG. 2.

Experiment 3

In the coaxial-type laser oscillator in FIG. 1, glass tubes having diameter of 9 mm and discharge length of 1.2 m were used as the discharge tubes 14 and 15, and two blowers each having blowing capacity of 5,600 l/min were used as the blower 17 for circulating laser gas at high speed. The laser gas flow speed was observed at a speed of 335 m/sec. Reynolds number R was calculated in the same manner as experiment 1 and a value of $R = 3.2 \times 10^3$ was obtained. The laser output power was 140 W in single mode performance. As a result, 116 W/m of the laser power P per unit discharge length was obtained to plot as point 3 in FIG. 2.

Experiment 4

In the coxial type laser oscillator in FIG. 1, glass tubes having diameter of 13 mm and discharge length of 1.2 m were used as the discharge tubes 14 and 15, and a blower of blowing capacity of 5,600 l/min was used as the blower 17 for circulating laser gas at high speed. The laser gas pressure in the laser tube was observed as 120 Torr and the flow speed of the laser gas as 180 m/sec. Reynolds number R was obtained as $R = 7.0 \times 10^3$ and the laser output power was 282 W in single mode performance. As a result, 235 W/m of the laser output power P per unit discharge length was obtained to plot as point 4 in FIG. 2.

Experiment 5

In this experiment, a blower having blowing capacity of 9,000 l/min was used in place of the blower of 5,600 l/min in the experiment 4. The laser gas speed reached 280 m/sec and therefore, the Reynolds number was calculated as $R = 1 \times 10^4$. The laser output power was observed as 360 W in single mode operation. The laser output power P per unit length of the discharge was therefore 300 W/m as plotted at point 5 in FIG. 2.

Experiment 6

In the coaxial-type laser oscillator in FIG. 1, glass tubes having diameter of 9 mm and discharge length of 90 cm were used as the discharge tubes 14 and 15, and a blower having a blowing capacity of 250 l/min was used as the blower 17 for circulating laser gas at high speed. The laser gas pressure in the laser tube was observed as 40 Torr and the flow speed of the laser gas as 51 m/sec. The Reynolds number R was obtained as $R = 3.8 \times 10^2$ and the laser output power was 99 W in single mode performance. As a result, 110 W/m of the laser output power P per unit discharge length was obtained to plot as point 6 in FIG. 2.

Figure 3:
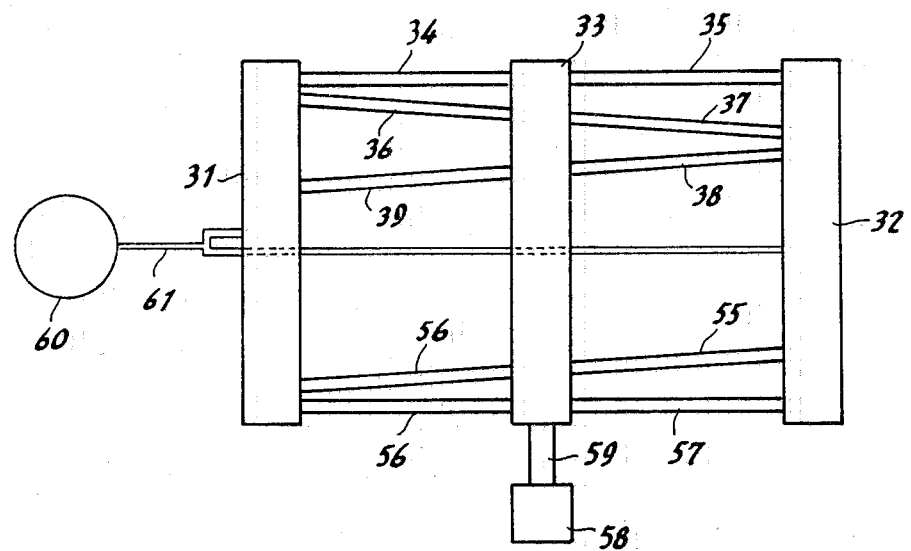
FIG. 3 is a conceptional block diagram of a modified embodiment of the laser oscillator according to the present invention.

Referring now to FIG. 3, a coaxial-type laser oscillator having plural discharge tubes according to the present invention is illustrated. A mirror box 31 contains six total reflective mirrors each arranged at one end of discharge tubes 34 and 36, 38 and 40, . . . 54 and 56. Another mirror box 32 contains six total reflective mirrors and one partial reflective mirror, each of the total reflective mirrors arranged at one end of discharge tubes 35, 37 and 39, . . . 53 and 55, and the partial reflective mirror arranged at one end of the discharge tube 57 from which laser power is output. In each of the mirror boxes 31 and 32, cathode electrodes for causing electrical discharges in the discharge tubes 34, 35, 36, . . . 57 are located. Anode box 33 is disposed at another end of the discharge tubes 34, 35, 36 . . . 57, and anode electrodes are arranged therein to generate glow discharge between the cathode electrodes in the mirror boxes 31 and 32 by applying high electric voltage thereto. The discharge tubes 34, 35, . . . 57 are glass tubes having circular cross-sections and arranged in series connection for forming a long discharge length. A blower 58 for exhausting laser gas is connected to the anode box via piping 59. Numeral 60 represents a laser gas source from which laser gas is supplied to each of the discharge tubes 34, 35, . . . 57 via piping 61 and mirror boxes 31, 32. The laser gas paths of the oscillator are as follows: p (1) gas source 60→piping 61→mirror box 31→discharge tubes 34, 36, 38, . . . 56→anode box→piping 59→blower 58→to atmosphere.

(2) gas source 60→piping 61→mirror box 32→discharge tubes 35, 37, 39, . . . 57→anode box 33→piping 59→blower 58→to atmosphere the following is an explanation of an experiment using the laser oscillator in FIG. 3.

Experiment 7

In the coaxial-type carbon dioxide laser oscillator, twenty-four glass tubes of a diameter of 15.6 mm were used as discharge tubes 34, 35, . . . 57 to make a total discharge length 30 m. A blower with a blowing capacity of 250 l/min was used as the blower 58, whereby laser gas flow was divided and sent to the group of the discharge tubes 34, 36, 38, ... 56 and the group 35, 37, 39, ... 57, each group composed of thirteen discharge tubes arranged in parallel relation. The laser gas flow speed in each discharge tube was 1.5 m/sec and the laser gas pressure in each discharge tube was 40 Torr. The Reynolds number obtained in the same manner as that of the experiment 1 was $R=1.9\times10$. The laser output power in this experiment was 1.8 KW with single mode performance. Therefore, the laser output power P per unit discharge length was obtained as 60 W/m which was plotted in FIG. 2 as the point 7.

Table 1 shows relations between Reynolds numbers, laser power per unit discharge length and modes resulting from the experiments previously described.

TABLE 1

| Experiment | Reynolds Number R | Laser Oustput Power Per Unit Discharge Length P(W/m) | Mode |
|---|---|---|---|
| 1 | $1.7 \times 10^4$ | 1400 | multi |
| 2 | $2.9 \times 10^3$ | 216 | single |
| 3 | $3.2 \times 10^3$ | 116 | single |
| 4 | $7.0 \times 10^3$ | 235 | single |
| 5 | $1 \times 10^4$ | 300 | single |
| 6 | $3.8 \times 10^2$ | 110 | single |
| 7 | $1.9 \times 10$ | 60 | single |

Persons having ordinary skill in this field will understand that other Reynolds numbers between those listed in Table 1 and in the above-described experiments may be provided by suitable variation of the tube diameter and the density, viscosity and velocity of laser gas. Thus, the Reynolds numbers listed in Table 1 may be thought of as specific points in a range of values.

Figure 2:
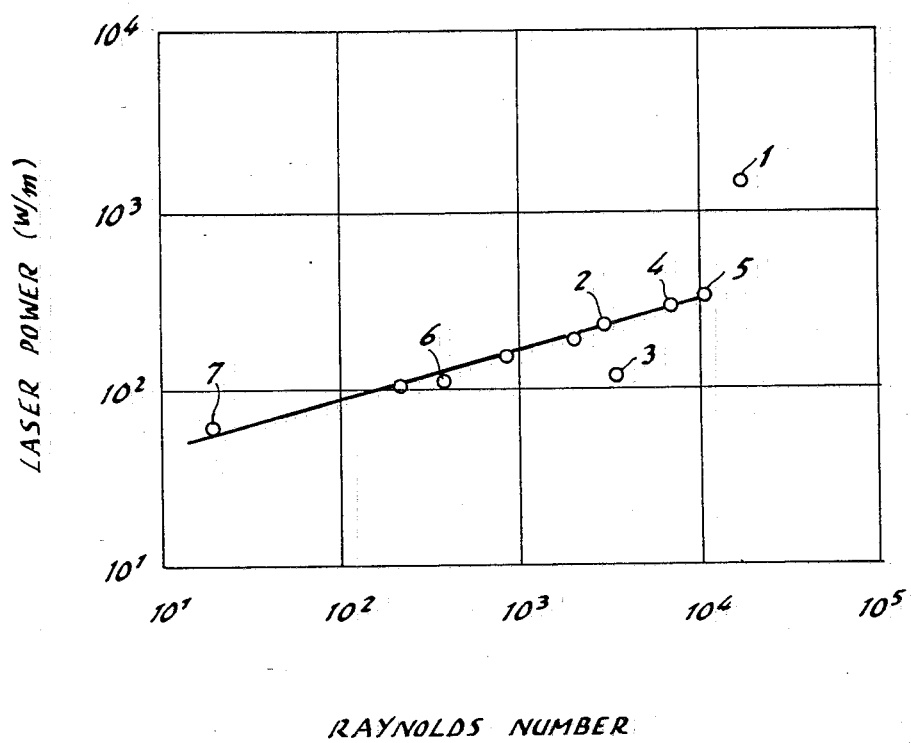
FIG. 2 is a graph showing output power Vs. Reynolds number characteristics of the laser oscillator according to the present invention.

The results shown in FIG. 2 and Table 1 teach that it is necessary, for obtaining high power laser oscillation with single mode performance, to select a Reynolds number equal to or smaller than $1 \times 10^4$.

Figure 4:
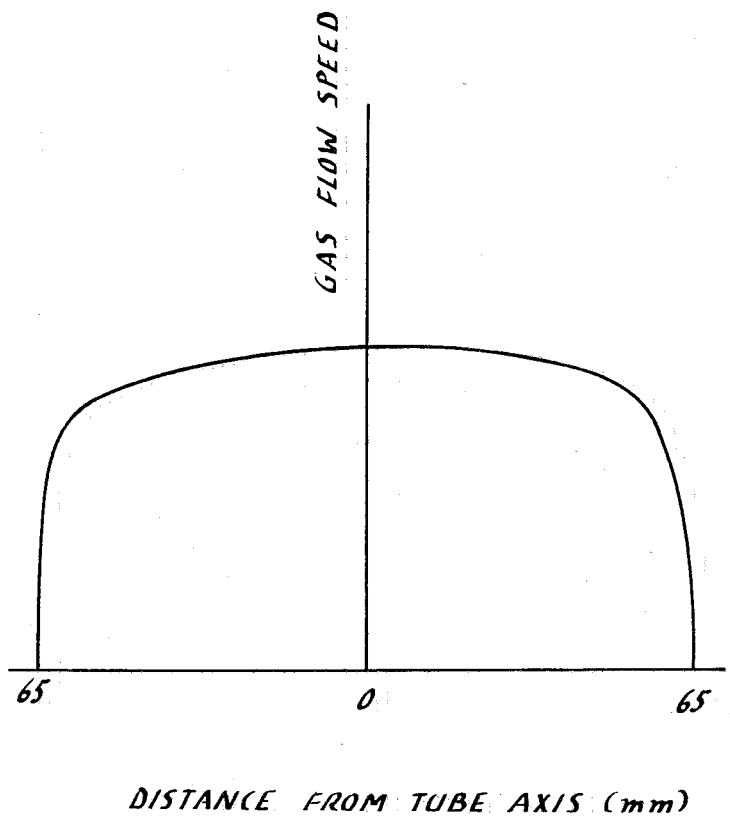
FIGS. 4 and 5 are graphs showing distribution characteristics of laser gas flow speed according to the present invention.
Figure 5:
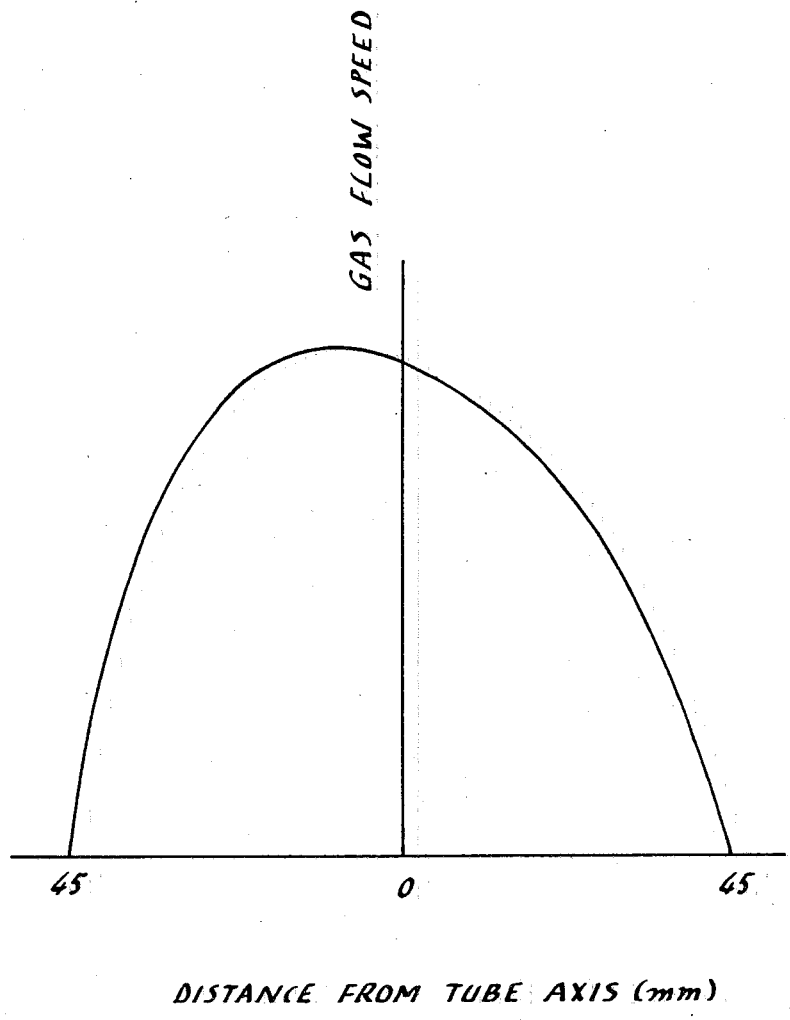

When observing the results of the experiments, the difference between the experiment 2 and experiment 3 is worth notice. Both of these experiments give high laser power outputs with single mode performance. However, the experiment 3 gives slightly small laser power outputs in spite of showing a substantially equivalent Reynolds number. The difference in these experiments results from the difference of the distribution of laser gas flow speed in the discharge tubes. FIG. 4 is an illustration of the distribution characteristics of the laser gas flow speed of the experiment 2. The characteristics clearly teach that the laser gas flow speeds of the experiment 2 are almost equal throughout the entire portion of the laser tube. Therefore, electric power for discharge is distributed uniformly in the laser tube. On the contrary, the distribution of the laser gas flow of the experiment 3 is not uniform in the discharge tube as illustrated in FIG. 5. The distribution characteristics in FIG. 5 show a distribution for a laminer like flow, whereby electric power for discharge tends to concentrate at the high gas flow portions. This means input electric power is not converted into laser energy throughout the entire area of the laser tube.

The difference of the distribution of the laser gas flow speed shown in FIGS. 4 and 5 may occur by the difference of frictional heat between the laser gas flow and the inner wall of the laser tube. The frictional heat of the experiment 2 is an amount approximating 40% of the frictional heating of experiment 3.

To obtain a uniform distribution of the laser gas flow speed, it is necessary to lower the fictional heat. The fictional heat is proportional to the square of the average gas flow speed in the laser tube, and the average gas flow speed is substantially proportional to $Q/D^2$, where Q is a blowing power of the blower and D an internal diameter of the discharge tube. Therefore, the frictional heat generated in the discharge tube is proportional to $Q^2/D^4$. As a result, the frictional heat generated per unit length around the inner wall of the discharge tube is proportional to $Q^2/D^5$, because the inner wall circuler length is $\pi D$. Table 2 represents the relationships between an inner diameter D of the discharge tube, flowing capacity Q of the flower, and $Q^2/D^5$ of the experiments previously described.

TABLE 2

| Experiments | Inner Diameter of the Discharge Tube D (cm) | Flowing Capacity of the Flower Q (cm³/sec) | $Q^2/D^5$ cm/sec² |
|---|---|---|---|
| 1 | 4.5 | $9.3 \times 10^5$ | $4.7 \times 10^8$ |
| 2 | 1.3 | $9.3 \times 10^4$ | $2.3 \times 10^9$ |
| 3 | 0.9 | $9.3 \times 10^4$ | $1.5 \times 10^{10}$ |
| 4 | 1.3 | $9.3 \times 10^4$ | $2.3 \times 10^9$ |
| 5 | 1.3 | $1.5 \times 10^5$ | $5.9 \times 10^9$ |
| 6 | 0.9 | $4.2 \times 10^3$ | $3.0 \times 10^7$ |
| 7 | 1.56 | $4.2 \times 10^3$ | $1.9 \times 10^6$ |

All the experiments except experiment 3 show lower $Q^2/D^5$ than $1 \times 10^{10}$ cm/sec², and it is necessary, for lowering the frictional heat and obtaining uniform speed distribution of the laser gas flow in the entire cross-sectional area of the discharge tube, to lower the value $Q^2/D^5$ below $1 \times 10^{10}$ cm/sec². In this manner high power laser output is obtained with a single mode and the effective flowing of the laser gas.

Persons having ordinary skill in this field will understand that other values of $Q^2/D^5$ between those listed in Table 2 and in the above-described experiments may be provided by suitable variation of the flowing capacity of the flower and the inner diameter of the discharge tube. Thus, the $Q^2/D^5$ values listed in Table 2 may be thought of as specific points in a range of values.

What is claimed is:

1. A carbon dixode laser oscillator for generating a single mode laser beam, comprising:
    a discharge tube having a predetermined inner diameter;
    a total reflective mirror arranged at one end of said discharge tube;
    a partially reflective mirror arranged at a second end of said discharge tube;
    a pair of electrodes arranged one at each end of said discharge tube and supplied with a potential for causing an electrical discharge in the discharge tube to produce said laser beam;
    means for supplying to said discharge tube a laser gas having a predetermined viscosity; and
    means for controlling density and velocity of said laser gas in said discharge tube at predetermined values respectively so that a Reynolds number given by said inner diameter of the tube and said density, viscosity and velocity of the gas is in the range between $1.9 \times 10$ and $1 \times 10^4$.

2. A carbon dioxide laser oscillator as claimed in claim 1, wherein said controlling means includes a blower, and wherein a frictional loss of said laser gas in said discharge tube is given by a value $Q^2/D^5$ which is smaller than $1\times10^{10}$ cm/sec$^2$, where Q is a flowing capacity of said blower and D is said inner diameter of said discharge tube.

3. A carbon dioxide laser oscillator as claimed in claim 1, wherein said laser gas is composed of the mixture of carbon dioxide, nitrogen and helium.

4. A carbon dioxide laser oscillator as claimed in claim 1, wherein said discharge tube includes a plurality of discharge tube members which are arranged in series connection for forming a long discharge length.

5. A carbon dioxide laser oscillator according to claim 1, wherein said laser oscillator is a coaxial-type laser oscillator.

6. A carbon dioxide laser oscillator as claimed in claim 1, wherein said Reynolds number is in the range between $7\times10^3$ and $1\times10^4$.

* * * * *